US011818819B1

(12) United States Patent
Lewis et al.

(10) Patent No.: US 11,818,819 B1
(45) Date of Patent: *Nov. 14, 2023

(54) CALIBRATION PROCEDURE FOR A LIGHT-EMITTING DIODE LIGHT SOURCE

(71) Applicant: Lutron Technology Company LLC, Coopersburg, PA (US)

(72) Inventors: Jason E. Lewis, Driftwood, TX (US); Jivan J. Luu, Austin, TX (US); Alcides J. Dias, Bee Cave, TX (US); Jacob Guerra, Austin, TX (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/688,284

(22) Filed: Mar. 7, 2022

Related U.S. Application Data

(63) Continuation of application No. 16/446,869, filed on Jun. 20, 2019, now Pat. No. 11,272,599.

(60) Provisional application No. 62/689,642, filed on Jun. 25, 2018, provisional application No. 62/688,746, filed on Jun. 22, 2018.

(51) Int. Cl.
| | |
|---|---|
| *H05B 45/50* | (2022.01) |
| *H05B 45/10* | (2020.01) |
| *H05B 47/19* | (2020.01) |
| *H05B 45/20* | (2020.01) |
| *H05B 47/195* | (2020.01) |
| *H05B 47/105* | (2020.01) |
| *H05B 47/115* | (2020.01) |

(52) U.S. Cl.
CPC ............. *H05B 45/50* (2020.01); *H05B 45/10* (2020.01)

(58) Field of Classification Search
CPC ........ H05B 45/10; H05B 47/19; H05B 45/20; H05B 47/195; H05B 47/105; H05B 47/115; H05B 47/185; H05B 45/37; H05B 47/11
See application file for complete search history.

(56) References Cited

U.S. PATENT DOCUMENTS

| | | | | |
|---|---|---|---|---|
| 2011/0309754 | A1* | 12/2011 | Ashdown ............... | H05B 45/39 315/151 |
| 2013/0009560 | A1 | 1/2013 | Takeda et al. | |
| 2015/0351187 | A1* | 12/2015 | McBryde ............... | H05B 45/37 315/185 R |

(Continued)

*Primary Examiner* — Wei (Victor) Y Chan
(74) *Attorney, Agent, or Firm* — Condo Roccia Koptiw LLP

(57) ABSTRACT

A lighting device, such as a controllable light-emitting diode (LED) light source, may execute a self-calibration procedure to compensate for changes in an optical system of the lighting device that may have occurred after an initial factory calibration procedure. The lighting device may include an emitter, a detector that generates a detector signal in response to detected light, a memory that stores a curve defining an optical compensation value with respect to a measured forward voltage of the detector, and a control circuit configured to receive a measured value of a luminous flux of the light emitted by the emitter that may be determined in response to the detector signal and based on the optical compensation value. The control circuit may adjust the curve defining the optical compensation value in response to a difference between the measured value and an expected value of the luminous flux.

29 Claims, 8 Drawing Sheets

(56) References Cited

U.S. PATENT DOCUMENTS

2015/0382425 A1* 12/2015 Lewis ................ G01J 1/44
                                                  250/208.2
2018/0084617 A1*  3/2018 Zhang ................ H05B 45/12

* cited by examiner

CALIBRATION PROCEDURE FOR A LIGHT-EMITTING DIODE LIGHT SOURCE

CROSS-REFERENCE TO RELATED APPLICATIONS

This application is a continuation of U.S. patent application Ser. No. 16/446,869, filed Jun. 20, 2019, which claims the benefit of U.S. Provisional Patent Application No. 62/688,746, filed Jun. 22, 2018, and U.S. Provisional Patent Application No. 62/689,642, filed Jun. 25, 2018, the entire disclosures of which are hereby incorporated by reference.

BACKGROUND

Lamps and displays using efficient light sources, such as light-emitting diodes (LED) light sources, for illumination are becoming increasingly popular in many different markets. LED light sources provide a number of advantages over traditional light sources, such as incandescent and fluorescent lamps. For example, LED light sources may have a lower power consumption and a longer lifetime than traditional light sources. In addition, the LED light sources may have no hazardous materials, and may provide additional specific advantages for different applications. When used for general illumination, LED light sources provide the opportunity to adjust the color (e.g., from white, to blue, to green, etc.) or the color temperature (e.g., from warm white to cool white) of the light emitted from the LED light sources to produce different lighting effects.

A multi-colored LED illumination device may have two or more different colors of LED emission devices (e.g., LED emitters) that are combined within the same package to produce light (e.g., white, or near-white light). There are many different types of white light LED light sources on the market, some of which combine red, green, and blue (RGB) LED emitters; red, green, blue, and yellow (RGBY) LED emitters; phosphor-converted white and red (WR) LED emitters; red, green, blue, and white (RGBW) LED emitters, etc. By combining different colors of LED emitters within the same package and driving the differently-colored emitters with different drive currents, these multi-colored LED illumination devices may generate white or near-white light within a wide gamut of color points or correlated color temperatures (CCTs) ranging from warm white (e.g., approximately 2600 K-3700 K), to neutral white (e.g., approximately 3700 K-5000 K) to cool white (e.g., approximately 5000 K-8300 K). Some multi-colored LED illumination devices also may enable the brightness (e.g., intensity or dimming level) and/or color of the illumination to be changed to a particular setpoint. These tunable illumination devices may all produce the same color and color rendering index (CRI) when set to a particular dimming level and chromaticity setting (e.g., color setpoint) on a standardized chromaticity diagram.

SUMMARY

As described herein, a lighting device, such as a controllable light-emitting diode (LED) light source, may execute a calibration procedure (e.g., a self-calibration procedure) to compensate for changes in an optical system of the lighting device that may have occurred after an initial calibration procedure (e.g., a factory calibration procedure) during manufacture of the lighting device. For example, the self-calibration procedure may be executed to compensate for changes to the optical system that may have occurred during assembly of the lighting device (e.g., at an installation site of the lighting device). The lighting device may include an emitter configured to emit light, a detector configured to generate a detector signal in response to detected light, a memory configured to store a curve defining an optical compensation value with respect to a measured forward voltage of the detector, and a control circuit configured to receive a measured value of a luminous flux of the light emitted by the emitter, and adjust the optical compensation value based on the measured forward voltage of the detector. The measured value of the luminous flux may be determined in response to the detector signal and based on the optical compensation value. The control circuit may execute the self-calibration procedure to determine an expected value of the luminous flux at the measured forward voltage of the detector and adjust the curve defining the optical compensation value in response to a difference between the expected value and the measured value of the luminous flux.

The emitter and the detector may be mounted to a substrate and encapsulated by a dome. The emitter, the detector, the substrate, and a lens may form the optical system of the lighting device, and the optical compensation value may be dependent upon characteristics of the optical system. The emitter may emit light through the dome and the detector may generate the detector signal in response to a portion of the light that is emitted by the emitter and reflected off the dome to the detector. The optical compensation value defines a relationship between a luminous flux of the light emitted through the dome by the emitter and a magnitude of the detector signal.

The lighting device may be assembled at the installation site, and changes to the optical system (e.g., such as contaminants left on the dome of the lighting device) may affect the operation of the lighting device. The control circuit of the lighting device may be configured to execute the self-calibration procedure when the lighting device is first powered on after the lighting device is assembled at the installation site (e.g., when the age of the lighting device is zero). The control circuit may determine an offset value (e.g., that may be equal to the difference between the expected value and the measured value of the luminous flux) and may add the offset value to the curve defining an optical compensation value with respect to a measured forward voltage of the detector. The control circuit of the lighting device may be configured to execute the self-calibration procedure after the lighting device has been running for some time (e.g., when the age of the lighting device is not zero). For example, the control circuit may be configured to determine an age of the lighting device, and to determine the expected value of the luminous flux at the measured forward voltage of the detector based on the age of the lighting device, prior to adjusting the curve defining the optical compensation value in response to a difference between the expected value and the measured value of the luminous flux.

DETAILED DESCRIPTION

Figure 1:
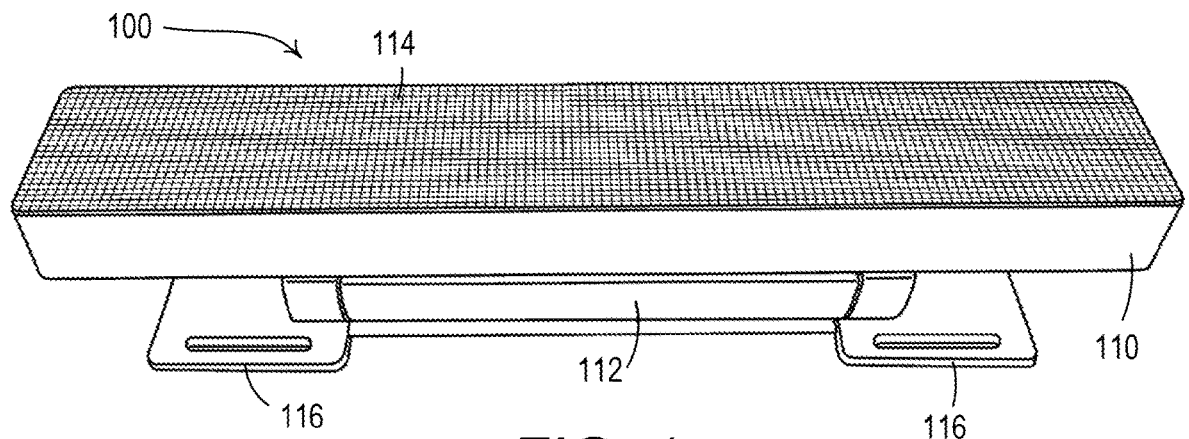
FIG. 1 is a simplified perspective view of an example linear light source.
Figure 2:
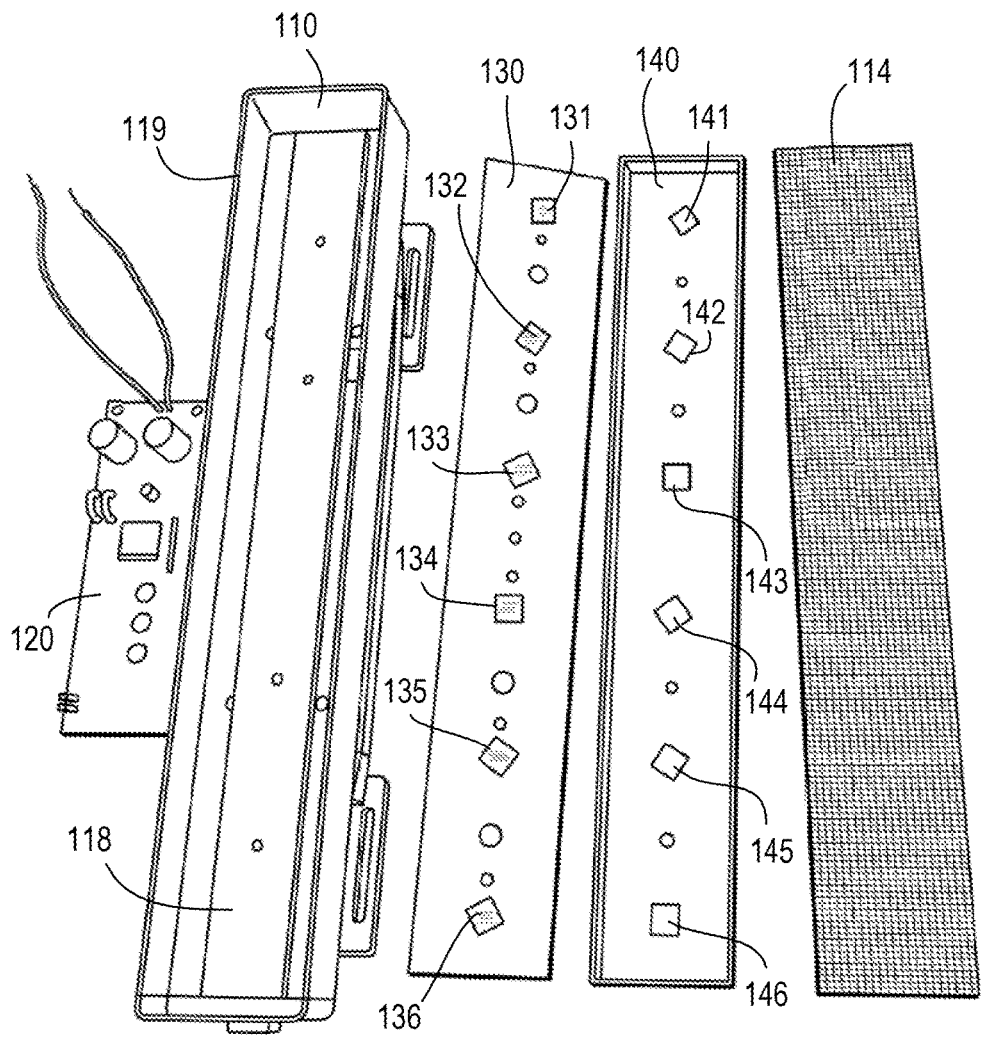
FIG. 2 is an exploded view of the linear light source of FIG. 1.

FIG. 1 is a simplified perspective view of an example illumination device, such as a linear light source 100 (e.g., a linear LED light source). The linear light source 100 may comprise an emitter housing 110, a control housing 112, a lens 114, and mounting brackets 116. FIG. 2 is an exploded view of the linear light source 100. The linear light source 100 may further comprise a control printed circuit board (PCB) 120, an emitter PCB 130, and a reflector 140 (e.g., a 120×120-degree reflector). The linear light source 100 may comprise one or more emitter modules 131-136 (e.g., six emitter modules) mounted to the emitter PCB 130, for example, aligned linearly as shown in FIG. 2. For example, the emitter modules 131-136 may be equally spaced apart, e.g., approximately two inches apart. Although the emitter PCB 130 is depicted in FIG. 2 with six emitter modules linearly aligned and equally spaced apart, the emitter PCB could have any number of emitter modules in any alignment and spaced apart by any distance.

The emitter modules 131-136 may be oriented at angles with respect to each other. For example, each adjacent emitter module 131-136 may be rotated approximately 120 degrees with respect to the adjacent emitter modules. The orientations of the emitter modules 131 and 134 (e.g., a first set of emitter modules) may be the same, the orientations of the emitter modules 132 and 135 (e.g., a second set of emitter modules) may be the same, and the orientations of emitter modules 133 and 136 (e.g., a third set of emitter modules) may be the same. The orientations of the second set of emitter modules 132 and 135 may be rotated 120 degrees from the orientations of the first set of emitter modules 131 and 134. Likewise, the orientations of the third set of emitter modules 133 and 136 may be rotated 120 degrees from the orientations of the second set of emitter modules 132 and 135, and 240 degrees from the orientations of the first set of emitter modules 131 and 134. The rotated orientations of the emitter modules 131-136 may enable the various colors of light produced by the plurality of emitter modules 131-136 to thoroughly mix. The emitter modules 131-136 may be rotated such that the pattern of rotations may be repeated if another linear light source is mounted adjacent to the linear light source 100 (e.g., with a first emitter module 131 of the additional linear light source located adjacent to the last emitter module 136 of the linear light source 100).

The emitter PCB 130 may be mounted in a recess 118 in the emitter housing 110. The reflector 140 may be mounted over (e.g., cover) the emitter PCB 130 and the emitter modules 131-136 may be received in respective openings 141-146 (e.g., square openings) in the reflector 140. The openings 141-146 of the reflector 140 may be slightly larger than the respective emitter modules 131-136 and may be rotated in similar orientations as the respective emitter modules 131-136. The lens 114 may be mounted above the reflector 140 and attached to sidewalls 119 of the emitter housing 110.

The control PCB 120 may be housed in the control housing 112 and may be electrically connected to the emitter PCB 130. The drive PCB 120 may be electrically connected to an external power source, such as an alternating-current (AC) power source, and may comprise one or more drive circuits and/or one or more control circuits for controlling the amount of power delivered to the emitter modules on the emitter PCB 130.

In some installations, such as an office building, the linear light source 100 may have a long length, for example, to extend across a large open office area. If the length of the linear light source 100 is too long to be shipped in final form, the linear light source may be shipped as multiple light sources and assembled at the installation site. For example, multiple emitter PCBs 130 may be connected together, installed in the respective emitter housings 110, and then finally enclosed by the respective lenses 114.

Figure 3:
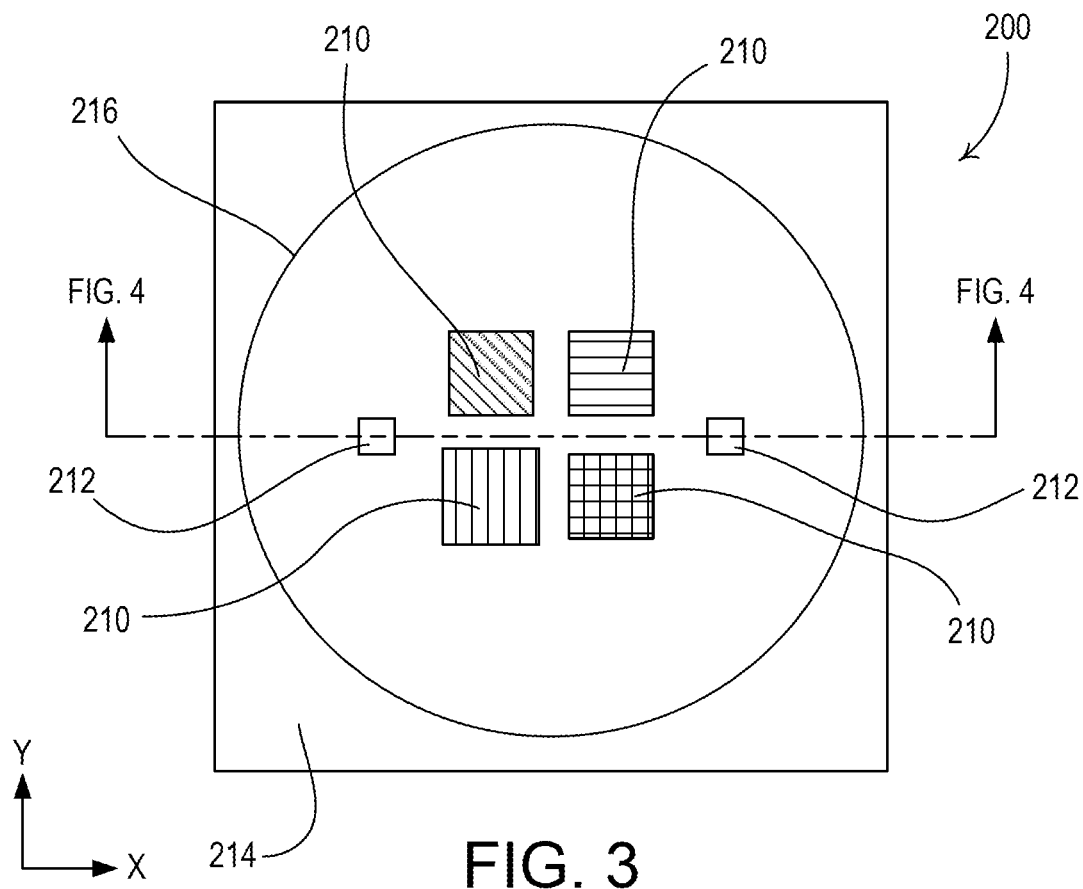
FIG. 3 is a top view of an example emitter module.
Figure 4:
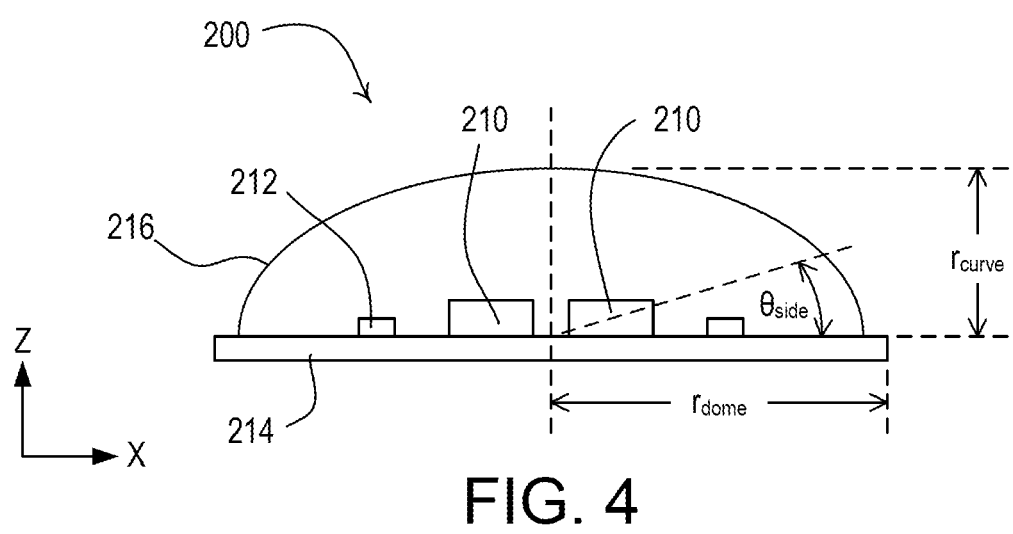
FIG. 4 is a side cross-sectional view of the emitter module of FIG. 3.

FIG. 3 is a top view of an example emitter module 200 (e.g., one of the emitter modules 131-136 of the linear light source 100). FIG. 4 is a side cross-section view of the emitter module 200 taken through the center of the emitter module (e.g., through the line shown in FIG. 3). The emitter module 200 may comprise an array of four emitters 210 (e.g., emission LEDs) and two detectors 212 (e.g., detection LEDs) mounted on a substrate 214 and encapsulated by a dome 216. The emitters 210, the detectors 212, the substrate 214, and the dome 216 may form an optical system. The emitters 210 may each emit light of a different color (e.g., red, green, blue, and white or amber), and may be arranged in a square array as close as possible together in the center of the dome 126, so as to approximate a centrally-located point source. The detectors 212 may be any device that produces current indicative of incident light, such as a silicon photodiode or an LED. For example, the detectors 212 may each be an LED having a peak emission wavelength in the range of approximately 550 nm to 700 nm, such that the detectors 212 may not produce photocurrent in response to infrared light (e.g., to reduce interference from ambient light). For example, a first one of the detectors 212 may comprise a small red, orange, or yellow LED, which may be used to measure a luminous flux of the light emitted by the red LED of the emitters 210. A second one of the detectors 212 may comprise a green LED, which may be used to measure a respective luminous flux of the light emitted by each of the green and blue LEDs of the emitters 210. Both detectors 212 may be used to measure the luminous flux of the white LED of the emitters 210 at different wavelengths (e.g., to characterize the spectrum of the light emitted by the white LED).

The substrate 214 of the emitter module 200 may be a ceramic substrate formed from an aluminum nitride or an aluminum oxide material, or some other reflective material, and may function to improve output efficiency of the emitter module 200 by reflecting light out of the emitter module through the dome 216. The dome 216 may comprise an optically transmissive material, such as silicone or the like, and may be formed through an over-molding process, for example. A surface of the dome 216 may be lightly textured to increase light scattering and promote color mixing, as well as to reflect a small amount of the emitted light back toward the detectors 212 mounted on the substrate 214 (e.g., about 5%). The size of the dome 216 (e.g., a diameter of the dome in a plane of the LEDs 210) may be generally dependent on the size of the LED array. The diameter of the dome may be substantially larger (e.g., about 1.5 to 4 times larger) than the diameter of the array of LEDs 210 to prevent occurrences of total internal reflection.

The size and shape (e.g., curvature) of the dome 216 may also enhance color mixing when the emitter module 200 is mounted near other emitter modules (e.g., in a similar manner as the emitter modules 131-136 mounted to the emitter PCB 130 of the linear light source 100). For example, the dome 216 may be a flat shallow dome as shown in FIG. 4. A radius $r_{dome}$ of the dome 216 in the plane of the emitters 210 array may be, for example, approximately 20-30% larger than a radius of curvature $r_{curve}$ of the dome 216. For example, the radius $r_{dome}$ of the shallow dome 216 in the plane of the LEDs may be approximately 4.8 mm and the radius $r_{curve}$ of the dome curvature (e.g., the maximum height of the dome above the plane of the LEDs) may be approximately 3.75 mm. Alternatively, the dome 216 may have a hemispherical shape. In addition, one skilled in the art would understand that alternative radii and ratios may be used to achieve the same or similar color mixing results.

By configuring the dome 216 with a substantially flatter shape, the dome 216 allows a larger portion of the emitted light to emanate sideways from the emitter module 200 (e.g., in an X-Y plane as shown in FIGS. 3 and 4). Stated another way, the shallow shape of the dome 216 allows a significant portion of the light emitted by the emitters 210 to exit the dome at small angles $\theta_{side}$ relative to the horizontal plane of the array of emitters. For example, the dome 216 may allow approximately 40% of the light emitted by the array of emitters 210 to exit the dome at approximately 0 to 30 degrees relative to the horizontal plane of the array of emitters. When the emitter module 200 is mounted near other emitter modules (e.g., as in the linear light source 100), the shallow shape of the dome 216 may improve color mixing in the linear light source by allowing a significant portion (e.g., 40%) of the light emitted from the sides of adjacent emitter modules to intermix before that light is reflected back out of the linear light source. Examples of emitter modules, such as the emitter module 200, are described in greater detail in U.S. Pat. No. 10,161,786, issued Dec. 25, 2018, entitled EMITTER MODULE FOR AN LED ILLUMINATION DEVICE, the entire disclosure of which is hereby incorporated by reference.

When the emitter module 200 is included in a light source that may be assembled at the installation site (e.g., such as the linear light source 100 shown in FIGS. 1 and 2), the optical system of the emitter module may be susceptible to changes in operation due to the assembly process. For example, contaminants (e.g., fingerprints, smudges, dust, dirt, etc.) may be left on the dome 216 after assembly, which may affect how the light emitted by the emitters 210 may be reflected back to the detectors 212 and thus affect the determined luminous flux for the emitters. The linear light source 100 may be configured to execute a calibration procedure (e.g., a self-calibration procedure or a field calibration procedure) after assembly of the linear light source (e.g., in the field at the installation site) to compensate for changes in the optical system that may have occurred during assembly of the linear light source.

Figure 5:
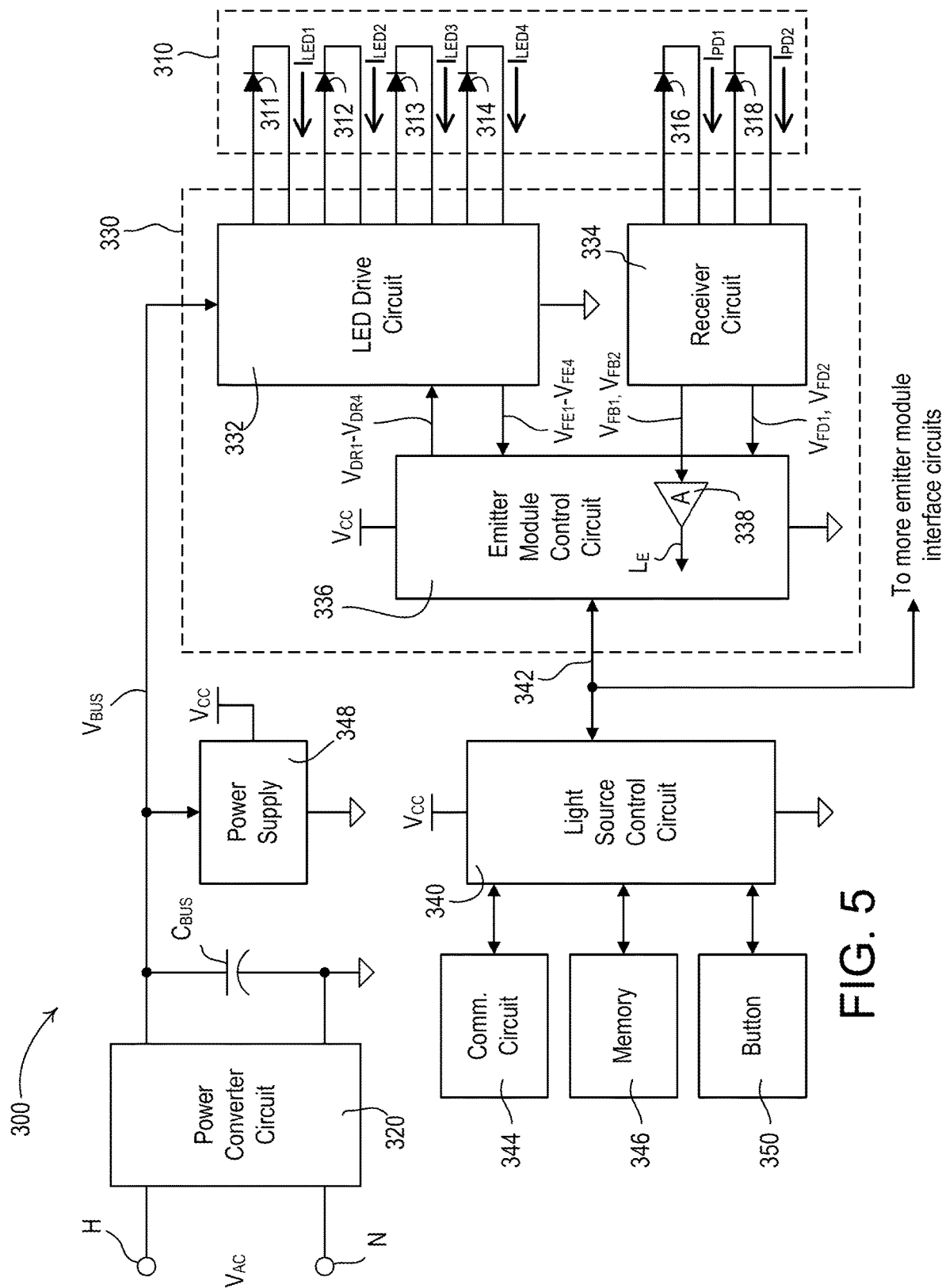
FIG. 5 is a simplified block diagram of a controllable lighting device.

FIG. 5 is a simplified block diagram of a controllable electrical device, such as a controllable lighting device 300 (e.g., the linear light source 100 shown in FIGS. 1 and 2). The controllable lighting device 300 may comprise one or more emitter modules 310 (e.g., the emitter modules 200 shown in FIGS. 3 and 4). Each emitter module 310 may comprise one or more emitters 311, 312, 313, 314. For example, the first emitter 311 may be a red LED, the second emitter 312 may be a blue LED, the third emitter 313 may be a green LED, and the fourth emitter 314 may be a white or amber LED. The emitters 311-314 may be controlled to adjust an intensity (e.g., a luminous flux) and/or a color (e.g., a color temperature) of a cumulative light output of the controllable lighting device 300. The emitters 311-314 are each shown in FIG. 5 as a single LED, but each emitter may comprise a plurality of LEDs connected in series (e.g., a chain of LEDs), a plurality of LEDs connected in parallel, or a suitable combination thereof, depending on the particular lighting system. In addition, each emitter 311-314 may comprise one or more organic light-emitting diodes (OLEDs). The emitter module 310 may also comprise one or more detectors 316, 318 (e.g., photodiodes, such as a red LED and a green LED) that may produce respective photodiode currents $I_{PD1}$, $I_{PD2}$ (e.g., detector signals) in response to incident light.

The controllable lighting device 300 may comprise a power converter circuit 320, which may receive a source voltage, such as an alternating-current (AC) mains line voltage $V_{AC}$ from an AC power source (not shown), via a hot connection H and a neutral connection N, and generate a direct-current (DC) bus voltage $V_{BUS}$ (e.g., approximately 15-20 V) across a bus capacitor $C_{BUS}$. The power converter circuit 320 may comprise, for example, a boost converter, a buck converter, a buck-boost converter, a flyback converter, a single-ended primary-inductance converter (SEPIC), a Ćuk converter, or any other suitable power converter circuit for generating an appropriate bus voltage. The power converter circuit 320 may provide electrical isolation between the AC power source and the emitters 311-314, and may operate as a power factor correction (PFC) circuit to adjust the power factor of the controllable lighting device 300 towards a power factor of one.

The controllable lighting device 300 may comprise one or more emitter module interface circuits 330 (e.g., one emitter module interface circuit per emitter module 310 in the controllable lighting device 300). The emitter module interface circuit 330 may comprise an LED drive circuit 332 for controlling (e.g., individually controlling) the power delivered to and the luminous flux of the light emitted from each of the emitters 311-314 of the respective emitter module 310. The LED drive circuit 332 may receive the bus voltage $V_{BUS}$ and may adjust magnitudes of respective LED drive currents $I_{LED1}$, $I_{LED2}$, $I_{LED3}$, $I_{LED4}$ conducted through the LED light sources 311-314. The LED drive circuit 332 may comprise one or more regulation circuits (e.g., four regulation circuits), such as switching regulators (e.g., buck converters), for controlling the magnitudes of the respective LED drive currents $I_{LED1}$-$I_{LED4}$. An example of the LED drive circuit 332 is described in greater detail in U.S. Pat. No. 9,485,813, issued Nov. 1, 2016, entitled ILLUMINATION DEVICE AND METHOD FOR AVOIDING AN OVER-POWER OR OVER-CURRENT CONDITION IN A POWER CONVERTER, the entire disclosure of which is hereby incorporated by reference.

The emitter module interface circuit 330 may also comprise a receiver circuit 334 that may be electrically coupled to the detectors 316, 318 of the emitter module 310 for generating respective optical feedback signals $V_{FB1}$, $V_{FB2}$ in response to the photodiode currents $I_{PD1}$, $I_{PD2}$. The receiver circuit 334 may comprise one or more trans-impedance amplifiers (e.g., two trans-impedance amplifiers) for converting the respective photodiode currents $I_{PD1}$, $I_{PD2}$ into the optical feedback signals $V_{FB1}$, $V_{FB2}$. For example, the optical feedback signals $V_{FB1}$, $V_{FB2}$ may have DC magnitudes that indicate the magnitudes of the respective photodiode currents $I_{PD1}$, $I_{PD2}$.

The emitter module interface circuit 330 may also comprise an emitter module control circuit 336 for controlling the LED drive circuit 332 to control the intensities of the emitters 311-314 of the emitter module 310. The emitter module control circuit 336 may comprise, for example, a microprocessor, a microcontroller, a programmable logic device (PLD), an application specific integrated circuit (ASIC), a field-programmable gate array (FPGA), or any other suitable processing device or controller. The emitter module control circuit 336 may generate one or more drive signals $V_{DR1}$, $V_{DR2}$, $V_{DR3}$, $V_{DR4}$ for controlling the respective regulation circuits in the LED drive circuit 332. The emitter module control circuit 336 may receive the optical feedback signals $V_{FB1}$, $V_{FB2}$ from the receiver circuit 334 for determining the luminous flux $L_E$ of the light emitted by the emitters 311-314. The emitter module control circuit 336 may have one or more gain compensation circuits 338 that may receive the respective optical feedback signals $V_{FB1}$, $V_{FB2}$ and generate values that indicate the luminous flux $L_E$ of the light emitted by the emitters 311-314.

The emitter module control circuit 336 may also receive a plurality of emitter forward-voltage feedback signals $V_{FE1}$, $V_{FE2}$, $V_{FE3}$, $V_{FE4}$ from the LED drive circuit 332 and a plurality of detector forward-voltage feedback signals $V_{FD1}$, $V_{FD2}$ from the receiver circuit 334. The magnitude of the emitter forward-voltage feedback signals $V_{FE1}$-$V_{FE4}$ may be representative of the magnitudes of the forward voltages of the respective emitters 311-314, which may indicate temperatures $T_{E1}$, $T_{E2}$, $T_{E3}$, $T_{E4}$ of the respective emitters. If each emitter 311-314 comprises multiple LEDs electrically coupled in series, the emitter forward-voltage feedback signals $V_{FE1}$-$V_{FE4}$ may be representative of the magnitude of the forward voltage across a single one of the LEDs or the cumulative forward voltage developed across multiple LEDs in the chain (e.g., all of the series-coupled LEDs in the chain). The detector forward-voltage feedback signals $V_{FD1}$, $V_{FD2}$ may be representative of the magnitudes of the forward voltages of the respective detectors 316-318, which may indicate temperatures $T_{D1}$, $T_{D2}$ of the respective detectors. For example, the detector forward-voltage feedback signals $V_{FD1}$, $V_{FD2}$ may be equal to the forward voltages $V_{FD}$ of the respective detectors 316, 318.

The controllable lighting device 300 may comprise a light source control circuit 340 that may be electrically coupled to the emitter module control circuit 336 of each of the one or more emitter module interface circuits 330 via a communication bus 342 (e.g., an I²C communication bus). The light source control circuit 340 may be configured to control the emitter module interface circuits 330 to control the intensity (e.g., the luminous flux) and/or color of the cumulative light emitted by the controllable lighting device 300. The light source control circuit 340 may comprise, for example, a microprocessor, a microcontroller, a programmable logic device (PLD), an application specific integrated circuit (ASIC), a field-programmable gate array (FPGA), or any other suitable processing device or controller. The light source control circuit 340 may be configured to adjust (e.g., dim) a present intensity $L_{PRES}$ of the cumulative light emitted by the controllable lighting device 300 towards a target intensity $L_{TRGT}$, which may range across a dimming range of the controllable light source, e.g., between a low-end intensity $L_{LE}$ (e.g., a minimum intensity, such as approximately 0.1%-1.0%) and a high-end intensity $L_{HE}$ (e.g., a maximum intensity, such as approximately 100%). The light source control circuit 340 may be configured to adjust a present color temperature $T_{PRES}$ of the cumulative light emitted by the controllable lighting device 300 toward a target color temperature $T_{TRGT}$, which may range between a cool-white color temperature (e.g., approximately 3100 K-4500 K) and a warm-white color temperature (e.g., approximately 2000 K-3000 K).

The controllable lighting device 300 may comprise a communication circuit 344 coupled to the light source control circuit 340. The communication circuit 344 may comprise a wireless communication circuit, such as, for example, a radio frequency (RF) transceiver coupled to an antenna for transmitting and/or receiving RF signals. The wireless communication circuit may also be an RF transmitter for transmitting RF signals, an RF receiver for receiving RF signals, or an infrared (IR) transmitter and/or receiver for transmitting and/or receiving IR signals. The communication circuit 344 may be coupled to the hot connection H and the neutral connection N of the controllable lighting device 300 for transmitting a control signal via the electrical wiring using, for example, a power-line carrier (PLC) communication technique. The light source control circuit 340 may be configured to determine the target intensity $L_{TRGT}$ for the controllable lighting device 300 in response to messages (e.g., digital messages) received via the communication circuit 344.

The controllable lighting device 300 may comprise a memory 346 configured to store operational characteristics of the controllable lighting device 300 (e.g., the target intensity $L_{TRGT}$, the target color temperature $T_{TRGT}$, the low-end intensity $L_{LE}$, the high-end intensity $L_{HE}$, etc.). The memory 346 may be implemented as an external integrated circuit (IC) or as an internal circuit of the light source control circuit 340. The controllable lighting device 300 may comprise a power supply 348 that may receive the bus voltage $V_{BUS}$ and generate a supply voltage $V_{CC}$ for powering the light source control circuit 340 and other low-voltage circuitry of the controllable lighting device.

When the controllable lighting device 300 is on, the light source control circuit 340 may be configured to control the emitter modules 310 to emit light substantially all the time. The light source control circuit 340 may be configured to control the emitter modules 310 to disrupt the normal emission of light to measure one or more operational characteristics of the emitter modules during periodic measurement intervals. For example, during the measurement intervals, the emitter module control circuit 336 may be configured to individually turn on each of the different-colored emitters 311-314 of the emitter modules 310 (e.g., while turning off the other emitters) and measure the luminous flux of the light emitted by that emitter using one of the two detectors 316, 318. For example, the emitter module control circuit 336 may turn on the first emitter 311 of the emitter module 310 (e.g., at the same time as turning off the other emitters 312-314) and determine the luminous flux $L_E$ of the light emitted by the first emitter 311 from the first gain compensation circuit 338 in response to the first optical feedback signal $V_{FB1}$ generated from the first detector 316. In addition, the emitter module control circuit 336 may be configured to drive the emitters 311-314 and the detectors 316, 318 to generate the emitter forward-voltage feedback signals $V_{FE1}$-$V_{FE4}$ and the detector forward-voltage feedback signals $V_{FD1}$, $V_{FD2}$ during the measurement intervals. Methods of measuring the operational characteristics of emitter modules in a light source are described in greater detail in U.S. Pat. No. 9,332,598, issued May 3, 2016, entitled INTERFERENCE-RESISTANT COMPENSATION FOR ILLUMINATION DEVICES HAVING MULTIPLE EMITTER MODULES, the entire disclosure of which is hereby incorporated by reference.

Calibration values for the various operational characteristics of the controllable lighting device 300 may be stored in the memory 346 as part of a calibration procedure performed during manufacture of the controllable lighting device 300. Calibration values may be stored for each of the emitters 311-314 and/or the detectors 316, 318 of each of the emitter modules 310. For example, calibration values may be stored for measured values of luminous flux (e.g., in lumens), x-chromaticity, y-chromaticity, emitter forward voltage, photodiode current, and detector forward voltage. For example, the luminous flux, x-chromaticity, and y-chromaticity measurements may be obtained from the emitters 311-314 using an external calibration tool, such as a spectrophotometer. The values for the emitter forward voltages, photodiode currents, and detector forward voltages may be measured internally to the controllable lighting device 300. The calibration values for each of the emitters 311-314 and/or the detectors 316, 318 may be measured at a plurality of different drive currents, e.g., at 100%, 30%, and 10% of a maximum drive current for each respective emitter.

In addition, the calibration values for each of the emitters 311-314 and/or the detectors 316, 318 may be measured at a plurality of different operating temperatures. The controllable lighting device 300 may be operated in an environment that is controlled to multiple calibration temperatures and the values of the operational characteristics may be measured and stored. For example, the controllable lighting device 300 may be operated at a cold calibration temperature $T_{CAL-COLD}$, such as room temperature (e.g., approximately 25° C.), and a hot calibration temperature $T_{CAL-HOT}$ (e.g., approximately 85° C.). At each temperature, the calibration values for each of the emitters 311-314 and/or the detectors 316, 318 may be measured at each of the plurality of drive currents and stored in the memory 346.

After installation, the light source control circuit 340 of the controllable lighting device 300 may use the calibration values stored in the memory 346 to maintain a constant light output from the emitter modules 310. The light source control circuit 340 may determine target values for the luminous flux to be emitted from the emitters 311-314 to achieve the target intensity $L_{TRGT}$ and/or the target color temperature $T_{TRGT}$ for the controllable lighting device 300. The light source control circuit 340 may determine the magnitudes for the drive currents $I_{DR}$ for each of the emitters 311-314 based on the determined target values for the luminous flux to be emitted from the emitters 311-314. When the age of the controllable lighting device 300 is zero, the magnitudes of each of the drive currents $I_{DR}$ for the emitters 311-314 may be controlled to an initial magnitude $I_{DR-INITIAL}$.

The light output of the emitter modules 310 may decrease as the emitters 311-314 age. The light source control circuit 340 may be configured to increase the magnitudes of the drive current $I_{DR}$ for the emitters 311-314 to adjusted magnitudes $I_{DR-ADJUSTED}$ to achieve the determined target values for the luminous flux of the target intensity $L_{TRGT}$ and/or the target color temperature $T_{TRGT}$. Methods of adjusting the drive currents of emitters to achieve a constant light output as the emitters age are described in greater detail in U.S. Pat. No. 9,769,899, issued Sep. 29, 2017, entitled ILLUMINATION DEVICE AND AGE COMPENSATION METHOD, the entire disclosure of which is hereby incorporated by reference.

The light source control circuit 340 may configure the operation of the emitter module control circuit 336 using the calibration values such that the luminous flux of the light emitted by one or more of the emitters 311-314 of the emitter modules 310 may be determined from the optical feedback signals $V_{FB1}$, $V_{FB2}$. The temperatures of each of the detectors 316, 318 may affect the magnitudes of the respective photodiode currents $I_{PD1}$, $I_{PD2}$ and thus the determined luminous flux of the light emitted by one or more of the emitters 311-314. The light source control circuit 340 may also configure the operation of the emitter module control circuit 336 using the detector forward-voltage feedback signals $V_{FD1}$, $V_{FD2}$ to account for the temperatures of the respective detectors 316, 318.

The light source control circuit 340 may be configured to determine one or more optical compensation values (e.g., gains) that define relationships between the luminous flux $L_E$ of the light emitted by the emitters 311-314 and the magnitudes of the photodiode currents $I_{PD1}$, $I_{PD2}$ of the detectors 316, 318 that may be used to measure the luminous flux $L_E$ of the respective emitters. The light source control circuit 340 may be configured to adjust a gain A of each of the gain compensation circuits 338 of the emitter module control circuit 336 depending upon which of the emitters 311-314 is emitting light and which of the detectors 316, 318 is being used to measure the luminous flux of that emitter (e.g., an emitter-detector pair). The light source control circuit 340 may determine the gain A for each of the gain compensation circuits 338 as a function of two gain factors $A_1$ and $A_2$ (e.g., the sum of the gain factors). The gain factors $A_1$ and $A_2$ may each be a function of the measured forward voltage $V_{FD}$ of the detector 316, 318 being used (e.g., which may indicate the temperature $T_D$ of the detector).

The light source control circuit 340 may be configured to determine the gain factors $A_1$ and $A_2$, and thus the gain A to use to measure the luminous flux of one of the emitters 311-314 using one of the detectors 316, 318. For example, the first detector 316 may be used to measure luminous flux $L_E$ of the light emitted by the first emitter 311. The light source control circuit 340 may configure the gain A of the first gain compensation circuit 338 that is receiving the first optical feedback signal $V_{FB1}$. The light source control circuit 340 may receive the forward voltage $V_{FD}$ of the first detector 316 (e.g., as measured by the receiver circuit 334) from the emitter module control circuit 336 via the communication bus 342. The light source control circuit 340 may determine the gain factors $A_1$ and $A_2$ from the measured forward voltage $V_{FD}$ (e.g., using curves stored in memory as will be described in greater detail below). The light source control circuit 340 may then calculate the gain A by adding the gain factors $A_1+A_2$ and configure the first gain compensation circuit 338 of the emitter module control circuit 336 with the calculated gain A. As a result, the output of the gain compensation circuit 338 may represent the luminous flux $L_E$ of the light emitted by the first emitter 311, e.g., $L_E = (A_1+A_2) \cdot V_{FB1}$.

Figure 6:
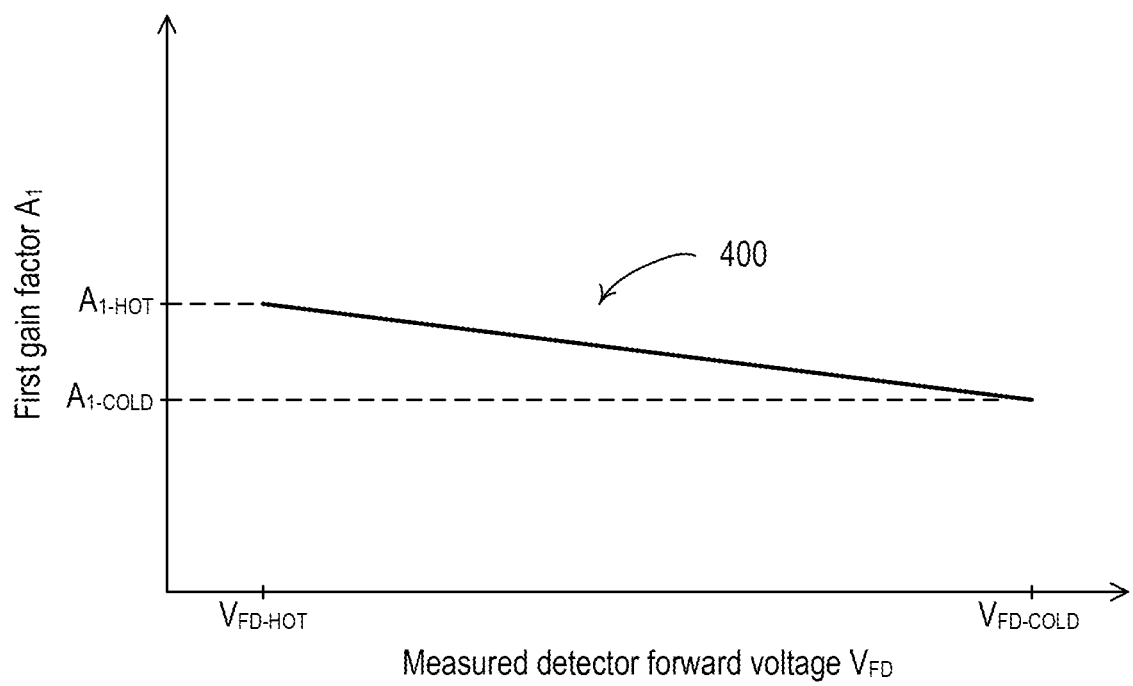
FIGS. 6-9 illustrate plots of various gain factors for gain compensation circuits that receive optical feedback signals from a detector with respect to a forward voltage of the detector.

FIG. 6 is an example first curve 400 that may be stored in the memory 346 and may be used to determine the first gain factor $A_1$ based on the forward voltage $V_{FD}$ of one of the detectors 316, 318. The memory 346 may store a first curve 400 for each of the emitter-detector pairs used to measure the luminous flux $L_E$ of each of the emitters 311-314. For example, storing the first curve 400 may include storing an equation(s) or function(s) that defines the curve, storing two or more values that define the curve, such as storing two or more points along the curve where a point may be defined, e.g., by respective x- and y-coordinates, etc., although one will recognize that the first curve 400 may be stored in the memory 346 in other fashions, such as by storing values that define the first curve 400 in a lookup table in the memory 346. The first curve 400 for determining the first gain factor $A_1$ may be, for example, a line that begins at a hot gain offset value $A_{1-HOT}$ at a hot detector forward voltage $V_{FD-HOT}$ and ends at a cold gain offset value $A_{1\text{-}COLD}$ at a cold detector forward voltage $V_{FD\text{-}COLD}$. The hot detector forward voltage $V_{FD\text{-}HOT}$ and the cold detector forward voltage $V_{FD\text{-}COLD}$ may be measured at the hot calibration temperature $T_{CAL\text{-}HOT}$ and the cold calibration temperature $T_{CAL\text{-}COLD}$, respectively, during the calibration procedure. The hot gain offset value $A_{1\text{-}HOT}$ may be determined from the magnitude of a photodiode current $I_{PD\text{-}HOT}$ of the respective detector 316, 318, and a luminous flux $L_{E\text{-}HOT}$ as measured at the hot calibration temperature $T_{CAL\text{-}HOT}$ during the calibration procedure, e.g., $A_{1\text{-}HOT}=L_{E\text{-}HOT}/I_{PD\text{-}HOT}$. The cold gain offset value $A_{1\text{-}COLD}$ may be determined from the magnitude of a photodiode current $I_{PD\text{-}COLD}$ of the respective detector 316, 318 and a luminous flux $L_{E\text{-}COLD}$ as measured at the cold calibration temperature $T_{CAL\text{-}COLD}$ during the calibration procedure, e.g., $A_{1\text{-}COLD}=L_{E\text{-}COLD}/I_{PD\text{-}COLD}$. The hot gain offset value $A_{1\text{-}HOT}$ may be associated with a hot detector forward voltage $V_{FD\text{-}HOT}$, which may be measured at the hot calibration temperature $T_{CAL\text{-}HOT}$, and cold gain offset value $A_{1\text{-}COLD}$ may be associated with a cold detector forward voltage $V_{FD\text{-}COLD}$, which may be measured at the cold calibration temperature $T_{CAL\text{-}COLD}$. The first curve 400 may be a linear interpolation between these two points: ($V_{FD\text{-}HOT}$, $A_{1\text{-}HOT}$) and ($V_{FD\text{-}COLD}$, $A_{1\text{-}COLD}$).

Figure 7:
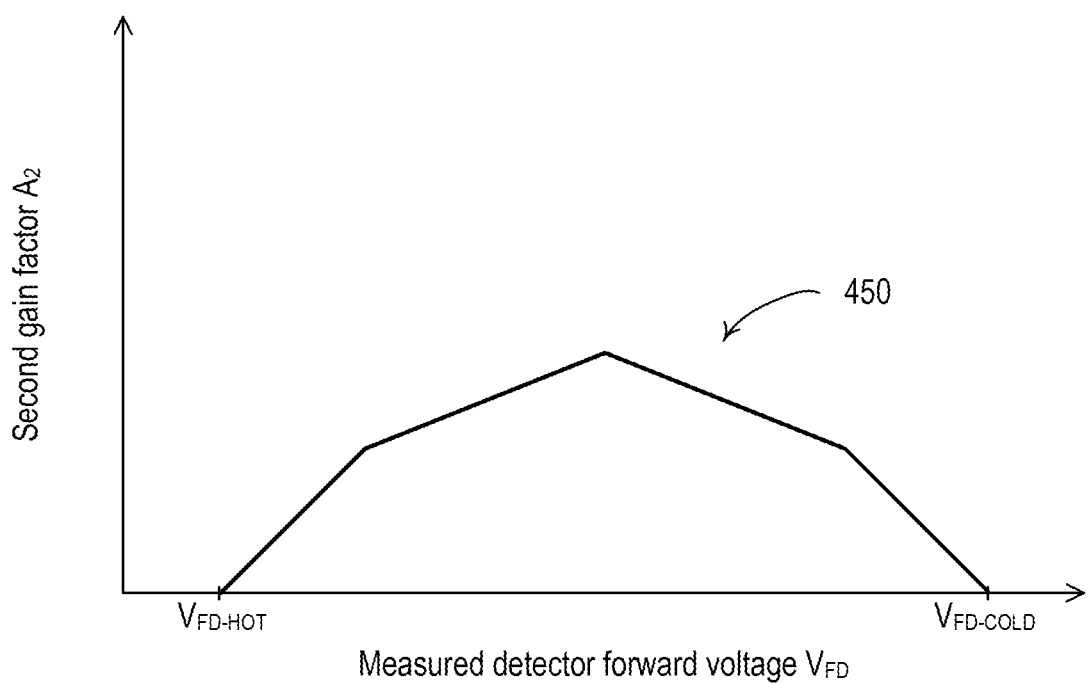
Figure 8:
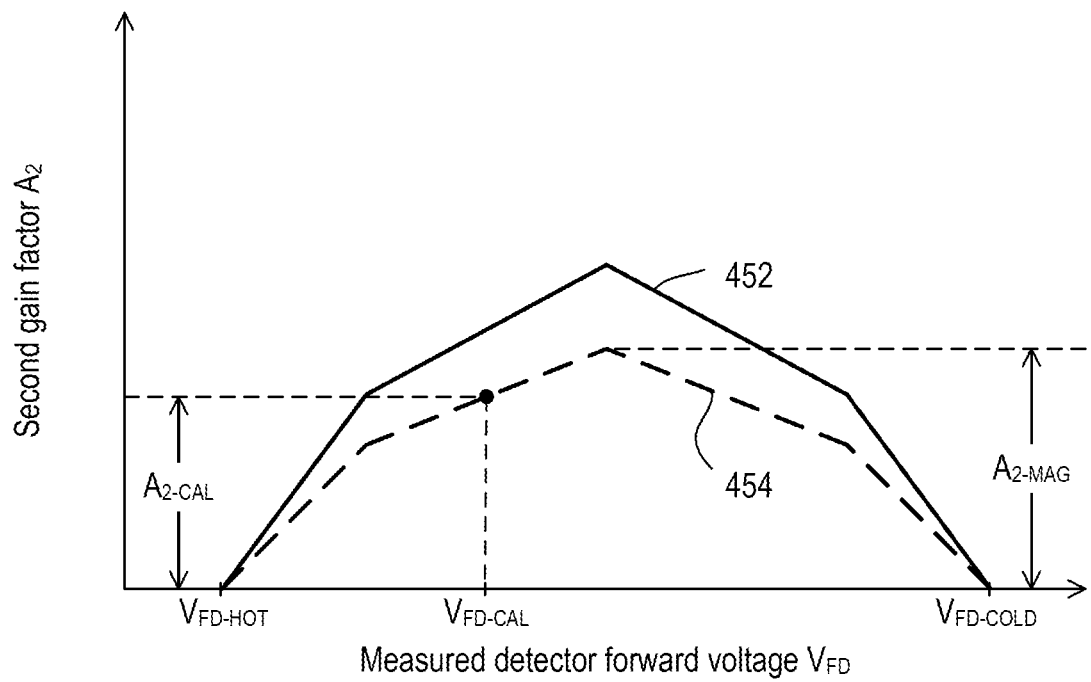

FIG. 7 is an example second curve 450 that may be stored in the memory 346 and may be used to determine the second gain factor $A_2$ based on the forward voltage $V_{FD}$ of one of the detectors 316, 318. The memory 346 may store a second curve 450 for each of the emitter-detector pairs used to measure the luminous flux $L_E$ of each of the emitters 311-314. For example, storing the second curve 450 may include storing equations or functions that define the curve, storing two or more values that define the curve, such as storing two or more points along the curve where a point may be defined, e.g., by respective x- and y-coordinates, etc., although one will recognize that the second curve 450 may be stored in the memory 346 in other fashions, such as by storing values that define the second curve 450 in a lookup table in the memory 346. The second curve 450 may define, for example, a non-linearity between the magnitude of the photodiode current $I_{PD}$ conducted through the respective detector 316, 318 and the temperature $T_D$ of the respective detector (e.g., the measured forward voltage $V_{FD}$ of the detector). The non-linearity may result from the optical performance of each of the emitter modules 310, for example, how light reflects off the dome 216 and back to the detectors 212. The second curve 450 may have a characteristic shape that may be based on a nominal curve 452 (e.g., a characteristic curve) as shown in FIG. 8.

The second curve 450 may be characterized by a magnitude $A_{2\text{-}MAG}$ that may be determined during the calibration procedure. For example, during the calibration procedure, the light source control circuit 340 may control one of the emitters (e.g., one of emitters 311-314) to emit light at a predetermined luminous flux $L_{CAL}$ (e.g., a calibration luminous flux), which may cause the emitter module 300 to heat up to an intermediate calibration temperature $T_{CAL}$. The light source control circuit 340 may determine a calibration forward voltage $V_{FD\text{-}CAL}$ of the respective detector 316, 318, which may indicate the calibration temperature $T_{CAL}$. The light source control circuit 340 may also determine the photodiode current $I_{PD}$ of the respective detector 316, 318, and determine a gain $A_{CAL}$ required to cause the output of the respective gain compensation circuit to indicate the predetermined luminous flux $L_{CAL}$. The light source control circuit 340 may also calculate a second gain factor $A_{2\text{-}CAL}$ from the determined gain $A_{CAL}$, e.g., $A_{2\text{-}CAL}=A_{CAL}-A_{1\text{-}CAL}$, where the first gain factor $A_{1\text{-}CAL}$ may be determined from the first curve 400 (e.g., as shown in FIG. 6). The light source control circuit 340 may fit the second curve 450 to cross the determined second gain factor $A_{2\text{-}CAL}$, for example, by scaling the nominal curve 452 to generate a fitted curve 454 as shown in FIG. 8. The magnitude $A_{2\text{-}MAG}$ of the second curve 450 may be determined from the fitted curve 454 and stored in the memory 346.

Figure 9:
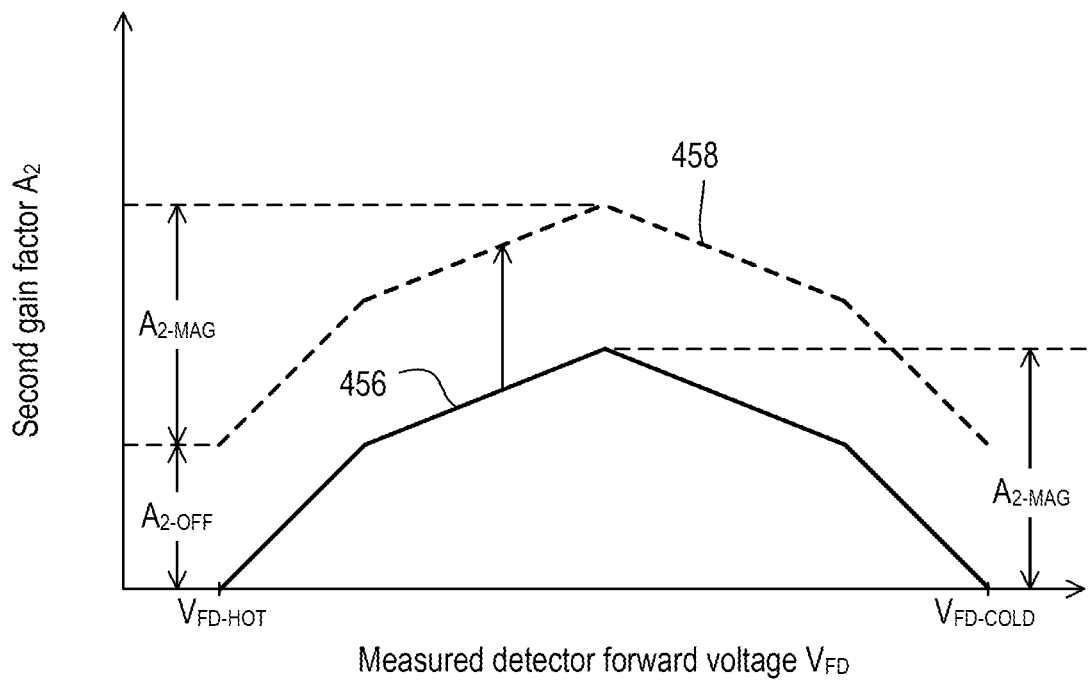

If the controllable lighting device 300 is a linear light source that may be constructed at the installation site, the second curve 450 may also be characterized by an offset value $A_{2\text{-}OFF}$ (e.g., as shown in FIG. 9) after being assembled. After the initial calibration procedure, the offset value $A_{2\text{-}OFF}$ of the second curve 450 may be approximately zero (e.g., as shown in FIGS. 7 and 8). However, contaminants that may reside on the emitter modules 310 after assembly at the installation site may cause the second curve 450 to have the offset value $A_{2\text{-}OFF}$. The light source control circuit 340 may be configured to execute a calibration procedure (e.g., a self-calibration procedure) to determine the offset value $A_{2\text{-}OFF}$ and update the second curve 450 as stored in the memory 346. For example, the light source control circuit 340 may be configured to add the offset value $A_{2\text{-}OFF}$ to an initial curve 456 (e.g., which may be the same as the fitted curve 454) to generate an adjusted curve 458 as shown in FIG. 9 (where adding a value to a curve may depend, for example, how the curve is defined, and may include, for example, modifying an equation(s) or function(s) that defines the curve, modifying two or more values (such as modifying respective x and/or y coordinates) that define the curve, etc., although one will recognize that a value may be added to a curve in other fashions).

The self-calibration procedure may be executed by the light source control circuit 340 after assembly at the installation site. For example, the light source control circuit 340 may execute the self-calibration procedure the first time that the controllable lighting device 300 is powered up (e.g., when the age of the controllable lighting device 300 is zero) to make an initial determination of the offset value $A_{2\text{-}OFF}$. The light source control circuit 340 may also execute the self-calibration procedure in response to receiving a command via the communication circuit 344, for example, from a mobile device (e.g., a smart phone or tablet), a computing device (e.g., a personal computer or laptop), or other programming tool. In addition, the light source control circuit 340 may execute the self-calibration procedure in response to an actuation of a button 350 on the controllable lighting device 300 (e.g., a button that extends through the emitter housing 110 and/or the control housing 112 and may be actuated after the lens 114 is installed). Further, the light source control circuit 340 may automatically execute the self-calibration procedure. For example, the light source control circuit 340 may automatically execute the self-calibration procedure in response to detecting that the lens 114 has been removed and re-installed, in response to detecting that the emitter PCB 130 has been installed adjacent to another emitter PCB 130, and/or in response to detecting that the controllable lighting device 300 has been serviced. In addition, the light source control circuit 340 may be configured to automatically execute the self-calibration procedure each time that the controllable lighting device 300 powers up.

Figure 10:
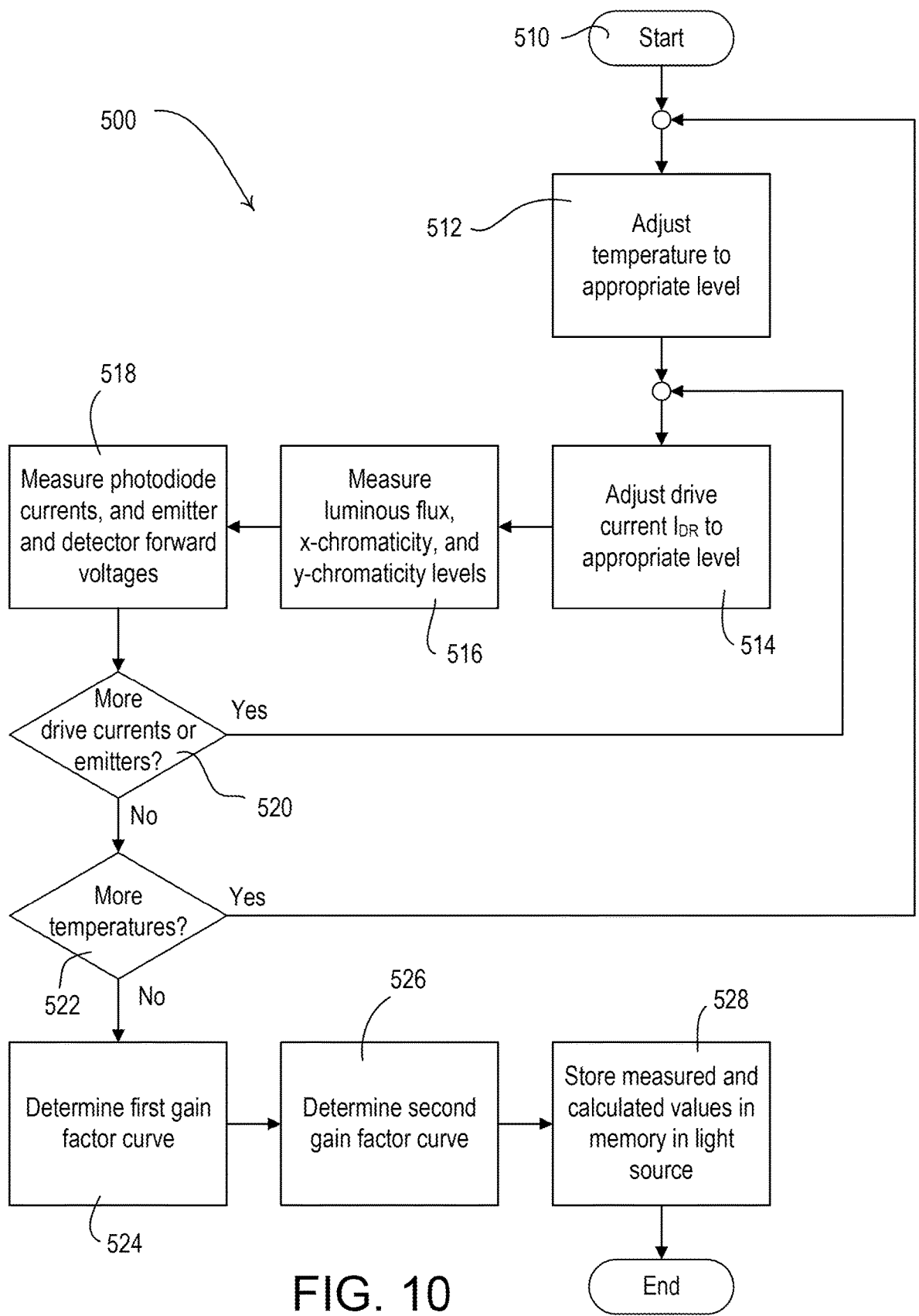
FIGS. 10 and 11 are simplified flowcharts of example calibration procedures (e.g., factory calibration procedures).

FIG. 10 is a simplified flowchart of an example calibration procedure 500 (e.g., a factory calibration procedure) that may be executed at 510 during a manufacturing process of a light source, such as the controllable lighting device 300. During the calibration procedure 500, the controllable lighting device 300 may be placed in a test system (e.g., a test environment) that may have a spectrophotometer and/or may be controlled to adjust a temperature of the test environment. The calibration procedure 500 may be executed in full and/or in part for one or more of a control circuit of the light source (e.g., the light source control circuit 340 of the controllable lighting device 300) and/or a controller of the test system. For example, the calibration procedure 500 may be executed to measure calibration values for each of the emitters 311-314 and/or the detectors 316, 318 of the controllable lighting device 300, and determine the hot gain offset value $A_{1-HOT}$ and the cold gain offset value $A_{1-COLD}$ for each of the emitter-detector pairs used to measure the luminous flux $L_E$ of the emitters 311-314.

During the calibration procedure 500, the temperature of the test system may be adjusted to a plurality of different operating temperatures, and the calibration values may be measured at each temperature. Referring to FIG. 10, the temperature of the test system may be controlled an appropriate level at 512. For example, the temperature may first be controlled to a cold calibration temperature $T_{CAL-COLD}$, such as room temperature (e.g., approximately 25° C.), and subsequently controlled to a hot calibration temperature $T_{CAL-HOT}$ (e.g., approximately 85° C.).

During the calibration procedure 500, each of the emitters (e.g., each of the emitters 311-314) may be individually turned on, and the calibration values may be measured while the single emitter is illuminated. In addition, the magnitude of a drive current conducted through each of the emitters of the light source may be adjusted to different magnitudes while the temperature of the test system is at each of the different operating temperatures, and the calibration values may be measured at each of the different magnitudes of the drive current. Referring to FIG. 10, the magnitude of the drive current of the emitter that is presently on may be adjusted to an appropriate magnitude at 514. For example, the magnitude of the drive current may be adjusted to a maximum drive current $I_{MAX}$ (e.g., 100%), then to 30% of the maximum drive current $I_{MAX}$, and finally to 10% of the maximum drive current $I_{MAX}$.

At 516, the luminous flux, x-chromaticity, and y-chromaticity of the light emitted by the light source may be measured with one of the emitters on at the drive current $I_{DR}$ set at 514 and at the temperature set at 512. For example, the luminous flux, x-chromaticity, and y-chromaticity of the light emitted by the light source may be measured by the spectrophotometer of the test system at 516. At 518, the magnitudes of the photodiode currents of the detectors, the forward voltages of the emitters, and the forward voltages of the detectors may be measured, e.g., in response to the internal feedback signals of the controllable lighting device 300.

If there are more magnitudes of the drive current $I_{DR}$ to apply to the emitter that is presently on or there are more emitters to individually illuminate at 520, the calibration procedure 500 may loop around to adjust the drive current(s) $I_{DR}$ appropriately at 514. If there are not more magnitudes of the drive current $I_{DR}$ to apply to the emitter that is presently on or there are not more emitters to individually illuminate at 520, but there are more temperatures to apply to the light source at 522, the calibration procedure 500 may loop around to adjust the temperature to the next level at 512.

If there are not more temperatures to apply to the light source at 522, a first gain factor curve (e.g., as shown in FIG. 6) may be determined and/or stored in memory at 524. For example, the first gain factor curve may be characterized by a hot gain offset value $A_{1-HOT}$ and a cold gain offset value $A_{1-COLD}$. The hot gain offset value $A_{1-HOT}$ may be calculated from the magnitude of a photodiode current $I_{PD-HOT}$ of the respective detector and a luminous flux $L_{E-HOT}$ as measured at the hot calibration temperature $T_{CAL-HOT}$, e.g., $A_{1-HOT}=L_{E-HOT}/I_{PD-HOT}$. The cold gain offset value $A_{1-COLD}$ may be calculated from the magnitude of a photodiode current $I_{PD-COLD}$ of the respective detector and a luminous flux $L_{E-COLD}$ as measured at the cold calibration temperature $T_{CAL-COLD}$, $A_{1-COLD}=L_{E-COLD}/I_{PD-COLD}$. The hot gain offset value $A_{1-HOT}$ may be associated with a hot detector forward voltage $V_{FD-HOT}$, which may be measured at the hot calibration temperature $T_{CAL-HOT}$, and cold gain offset value $A_{1-COLD}$ may be associated with a cold detector forward voltage $V_{FD-COLD}$, which may be measured at the cold calibration temperature $T_{CAL-COLD}$.

At 526, a second gain factor curve (e.g., as shown in FIG. 8) may be determined and/or stored in memory (e.g., as will be described in greater detail below with reference to FIG. 11). At 528, the calibration values measured at 516, 518 and/or calculated at 524, 526 may be stored in memory, and the calibration procedure 500 may exit.

Figure 11:
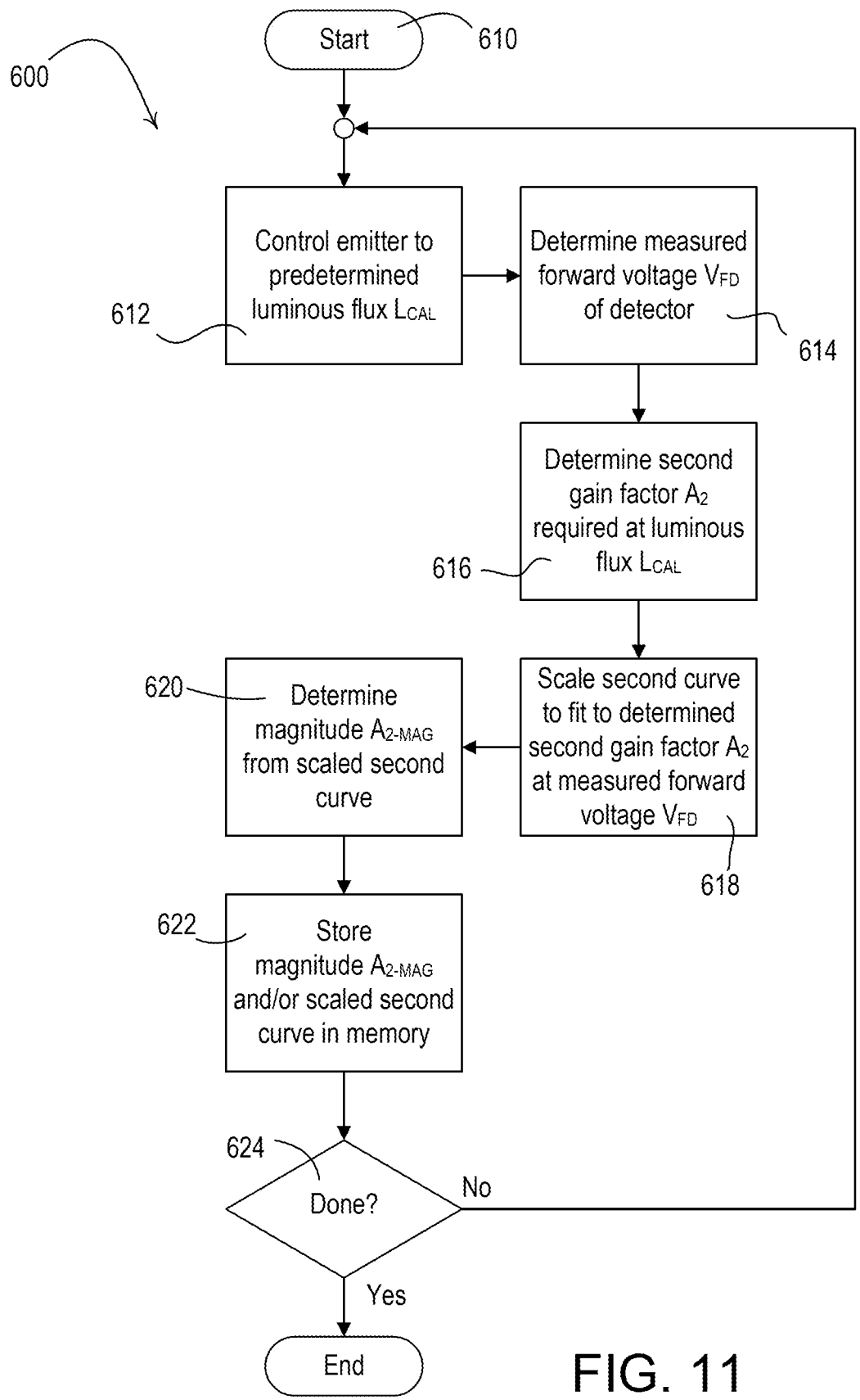

FIG. 11 is a simplified flowchart of an example calibration procedure 600 (e.g., a factory calibration procedure) that may be executed by a control circuit of a light source (e.g., the light source control circuit 340 of the controllable lighting device 300). For example, the calibration procedure 600 may be executed at 610 by the light source control circuit 340 during a manufacturing process of the light source (e.g., at 526 of the calibration procedure 500 shown in FIG. 10). For example, the light source control circuit 340 may execute the calibration procedure 600 to determine the magnitude $A_{2-MAG}$ of the second curve 450 for each of the emitter-detector pairs used to measure the luminous flux $L_E$ of one of the emitters 311-314.

At 612, the control circuit may adjust the drive currents $I_{DR}$ to control the luminous flux of the light emitted by one of the emitters (e.g., one of emitters 311-314) to a predetermined luminous flux $L_{CAL}$ (e.g., a calibration luminous flux), which may cause the emitter module 310 to heat up to an intermediate calibration temperature $T_{CAL}$. At 614, the control circuit may determine a measured forward voltage $V_{FD-CAL}$ (e.g., a calibration forward voltage) of the respective detector, which may indicate the intermediate calibration temperature $T_{CAL}$.

At 616, the control circuit may determine a gain factor $A_{2-CAL}$ required at the predetermined luminous flux $L_{CAL}$. For example, at 616, the control circuit may be configured to determine the photodiode current $I_{PD}$ of the respective detector, determine a gain value $A_{CAL}$ required to cause the output of the respective gain compensation circuit to indicate the predetermined luminous flux $L_{CAL}$, and calculate the second gain factor $A_{2-CAL}$ from the determined gain $A_{CAL}$, e.g., $A_{2-CAL}=A_{CAL}-A_{1-CAL}$, where the first gain factor $A_{1-CAL}$ may be determined from the first curve 400 (e.g., as shown in FIG. 6).

At 618, the control circuit may generate a fitted gain factor curve by scaling a nominal gain factor curve to fit to the second gain factor $A_{2-CAL}$ (e.g., as determined at 616) at the measured detector forward voltage $V_{FD-CAL}$ (e.g., as shown in FIG. 8). At 620, the control circuit may determine a magnitude $A_{2-MAG}$ from the fitted gain factor curve. At 622, the control circuit may store the magnitude $A_{2-MAG}$ of the fitted gain factor curve in memory. In addition, the control circuit may store the fitted gain factor curve in memory (e.g., as values in a lookup table in memory) at 622. If the control circuit is not done calibrating the light source at 624 (e.g., there are more emitter-detector pairs to calibrate), the calibration procedure 600 may loop around to turn on the next emitter at 612. If the control circuit is done calibrating the light source at 624 (e.g., there are not more emitter-detector pairs to calibrate), the calibration procedure 600 may exit.

Figure 12:
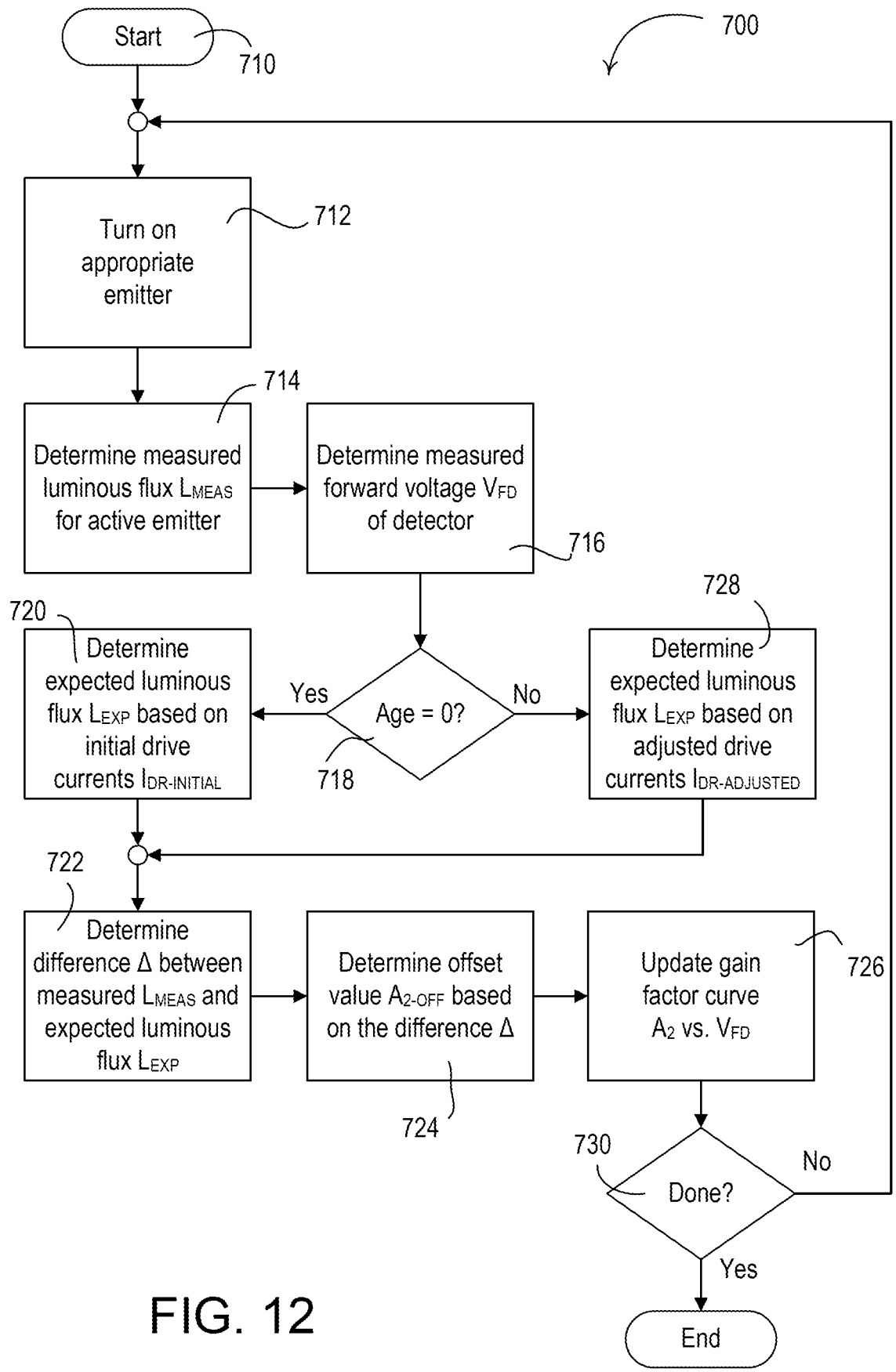
FIG. 12 is a simplified flowchart of another example calibration procedure (e.g., a self-calibration procedure).

FIG. 12 is a simplified flowchart of an example calibration procedure 700 (e.g., a self-calibration procedure or a field calibration procedure) that may be executed by a control circuit of a light source (e.g., the light source control circuit 340 of the controllable lighting device 300). For example, the light source control circuit 340 may execute the calibration procedure 700 to determine the offset value $A_{2\text{-}OFF}$ of the second gain factor $A_2$ (e.g., of the second curve 450) for each of the emitter-detector pairs used to measure the luminous flux $L_E$ of the emitters 311-314 of the controllable light source 300. The light source control circuit 340 may be configured to execute the calibration procedure 700 after execution of an initial factory calibration procedure (e.g., the calibration procedure 500 and/or the calibration procedure 600) For example, the light source control circuit 340 may be configured to execute the calibration procedure 700 after assembly of the light source (e.g., in the field at the installation site) to compensate for changes to the optical system that may have occurred during assembly of the light source. The light source control circuit 340 may execute the calibration procedure 700 in response to receiving a calibration command at 710, for example, in a message received via the communication circuit 344.

At 712, the control circuit may turn on one or more of the emitters to be calibrated. For example, the light source control circuit 340 may control the emitter module control circuit 336 to turn on only the first emitter 311 (e.g., the red LED) of each of the emitter modules 310 at 712. In addition, the light source control circuit 340 may control the emitter module control circuit 336 to adjust the magnitude of the respective drive current (e.g., the first drive current $I_{DR1}$) to an appropriate level (e.g., a calibration level) at 712.

At 714, the control circuit may determine a measured luminous flux $L_{MEAS}$ for the emitter that was turned on at 712. For example, the emitter module control circuit 336 may determine the measured luminous flux $L_{MEAS}$ of the first emitter 311 from the first detector 316 (e.g., in response to the first optical feedback signal $V_{FB1}$) and may transmit the measured luminous flux $L_{MEAS}$ to the light source control circuit 340 via the communication bus 342. At 716, the control circuit may determine the measured forward voltage $V_{FD}$ for the detector that was used to measure the luminous flux $L_E$ at 714. For example, the emitter module control circuit 336 may determine the magnitude of the first forward voltage $V_{FD1}$ of the first detector 316 (e.g., in response to the first detector forward-voltage feedback signal $V_{FB1}$) and may transmit the magnitude of the first forward voltage $V_{FD1}$ to the light source control circuit 340 via the communication bus 342.

If the age of the controllable lighting device 300 is zero at 718 (e.g., the lighting device was just assembled, installed, and powered on for the first time), the control circuit may determine an expected luminous flux $L_{EXP}$ for the emitter that is on at 720 and calculate a difference $\Delta$ between the expected luminous flux $L_{EXP}$ and the measured luminous flux $L_{MEAS}$ at 722. For example, the light source control circuit 340 may determine the expected luminous flux $L_{EXP}$ for the first emitter 311 at 720 based on the magnitude (e.g., the initial magnitude $I_{DR\text{-}INITIAL}$) of the first drive current $I_{DR1}$ and/or one or more of the measured operating characteristics, such as the magnitudes of the emitter forward voltages $V_{FE}$ and/or the detector forward voltages $V_{FD}$. For example, the light source control circuit 340 may determine the offset value $A_{2\text{-}OFF}$ at 722 by subtracting the measured luminous flux $L_{MEAS}$ from the expected luminous flux $L_{EXP}$.

At 724, the control circuit may determine an offset value $A_{2\text{-}OFF}$ for the second gain factor $A_2$ based on the difference $\Delta$ between the expected luminous flux $L_{EXP}$ and the measured luminous flux $L_{MEAS}$ calculated at 722. For example, the control circuit may add the difference $\Delta$ between the expected luminous flux $L_{EXP}$ and the measured luminous flux $L_{MEAS}$ to the offset value $A_{2\text{-}OFF}$ at 724 (e.g., $A_{2\text{-}OFF} = A_{2\text{-}OFF} + \Delta$). When the age of the light source is zero, an initial value of the offset value $A_{2\text{-}OFF}$ may be zero and the control circuit may simply set the offset value $A_{2\text{-}OFF}$ equal to the difference $\Delta$ between the expected luminous flux $L_{EXP}$ and the measured luminous flux $L_{MEAS}$ at 724.

At 726, the control circuit may update a gain factor curve in memory. For example, the gain factor curve may define the second gain factor $A_2$ for the first emitter 311 with respect to the first forward voltage $V_{FD1}$ of the first detector 316. The light source control circuit 340 may update the gain factor curve by adding the determined offset value $A_{2\text{-}OFF}$ at 726. For example, the light source control circuit 340 may add the determined offset value $A_{2\text{-}OFF}$ to values of the second gain factor $A_2$ in a lookup table stored in the memory 346. In addition, the light source control circuit 340 may store the determined offset value $A_{2\text{-}OFF}$ in the memory 346 and use the stored offset value $A_{2\text{-}OFF}$ during normal operation of the controllable lighting device 300 when the gain A of the first gain compensation circuit 338 is being updated.

If the age of the controllable lighting device 300 is not zero at 718 (e.g., the lighting device has been running for some time), the control circuit may determine the offset value $A_{2\text{-}OFF}$ for the second gain factor $A_2$ using the determined age at 728. For example, the light source control circuit 340 may determine the expected luminous flux $L_{EXP}$ for the first emitter 311 at 728 based on the adjusted magnitude $I_{DR\text{-}ADJUSTED}$ of the first drive current $I_{DR1}$ (e.g., to account for the age of the first emitter 311) and/or one or more of the measured operating characteristics, such as the magnitudes of the emitter forward voltages $V_{FE}$ and/or the detector forward voltages $V_{FD}$. The control circuit may then determine the difference $\Delta$ by subtracting the measured luminous flux $L_{MEAS}$ from the expected luminous flux $L_{EXP}$ at 722, determine the offset value $A_{2\text{-}OFF}$ based on the difference $\Delta$ at 724, and update the gain factor curve in memory at 726. If the control circuit is not done calibrating the light source at 730 (e.g., there are more emitter-detector pairs to calibrate), the calibration procedure 700 may loop around to turn on the next emitter at 712. For example, the light source control circuit 340 may turn off the first emitter 311 and turn on the second emitter 312 at 712. If the control circuit is done calibrating the light source at 730 (e.g., there are not more emitter-detector pairs to calibrate), the calibration procedure 700 may exit.

While the calibration procedures described herein account for changes to the optical system of one or more emitter modules by adding the offset value $A_{2\text{-}OFF}$ to the second gain factor $A_2$, an offset value $A_{1\text{-}OFF}$ could also be added to the first gain factor $A_1$ (e.g., where in the first offset value $A_{1\text{-}OFF}$ may be equal to the second offset value $A_{2\text{-}OFF}$). In addition, the controllable lighting device 300 could be calibrated at additional calibration temperatures between the hot calibration temperature $T_{CAL\text{-}HOT}$ and the cold calibration temperature $T_{CAL\text{-}COLD}$, and the second gain factor $A_2$ may not be used to determine the gain A. The memory may store a gain curve (e.g., a single gain curve) defining the gain A with respect to the forward voltage $V_{FD}$ of the respective detector and an offset value $A_{OFF}$ may be added to the gain curve to account for changes to the optical system.

What is claimed is:

1. An LED lighting controller, comprising:
   control circuitry communicatively couplable to LED driver circuitry, the control circuitry to:
   for each pairing that includes one or more LED emitters operatively coupled to the LED driver circuitry and one or more photodetectors:
   determine for each of a plurality of drive currents a respective target luminous flux output of the one or more LED emitters;
   receive data corresponding to a measured luminous flux output of the one or more LED emitters responsive to application of respective ones of the plurality of driver currents to the one or more LED emitters;
   receive data representative of at least one photodetector electrical parameter, including at least one of: a photodetector current or a forward voltage across the one or more photodetectors, at each of the measured luminous flux outputs;
   determine a gain relationship between the target luminous flux output and the measured luminous flux output of the one or more LED emitters as a function of the photodetector electrical parameter; and
   identify differences between the determined gain relationship and data representative of a historical gain relationship stored in memory circuitry communicatively coupled to the control circuit; and
   determine one or more correction factors using the identified differences between the determined gain relationship and the historical gain relationship.

2. The LED lighting controller of claim 1, the control circuitry to further:
   save the data representative of the determined gain relationship as the data representative of the historical gain relationship such that the data representative of the measured gain relationship becomes the data representative of the historical gain relationship.

3. The LED lighting controller of claim 1 wherein the data representative of the historical gain relationship comprises:
   a mathematical relationship that includes a sum of a first gain factor with a second gain factor.

4. The LED lighting controller of claim 3 wherein the first gain factor comprises a first relationship that includes a ratio of the luminous flux of the respective one or more LED emitters to the current through the one or more photodetectors as a function of the measured forward voltage across the one or more photodetectors.

5. The LED lighting controller of claim 3 wherein the first relationship comprises an invariant linear relationship.

6. The LED lighting controller of claim 4 wherein the second gain factor comprises a second relationship between a gain needed to achieve a defined luminous flux output from the one or more LED emitters as a function of measured forward voltage across the one or more photodetectors.

7. The LED lighting controller of claim 6 wherein the second relationship comprises a variable, non-linear relationship.

8. The LED lighting controller of claim 6 wherein to determine one or more correction factors using the identified differences between the determined gain relationship and the historical gain relationship, the control circuit to:
   determine one or more correction factors to apply to a historical second gain factor to provide an updated second gain factor based on the identified differences between the determined gain relationship and the data representative of the historical gain relationship.

9. The LED lighting controller of claim 1 wherein to determine one or more correction factors using the identified differences between the determined gain relationship and the historical gain relationship, the control circuitry to further:
   determine one or more correction factors using the identified differences between the determined gain relationship and the historical gain relationship responsive to an initial application of power to the lighting device after installation of the lighting device.

10. The LED lighting controller of claim 1 wherein to determine one or more correction factors using the identified differences between the determined gain relationship and the historical gain relationship, the control circuitry to further:
    determine one or more correction factors using the identified differences between the determined gain relationship and the historical gain relationship responsive to each application of power to the lighting device after installation of the lighting device.

11. The LED lighting controller of claim 1 wherein to determine one or more correction factors using the identified differences between the determined gain relationship and the historical gain relationship, the control circuitry to further:
    determine one or more correction factors using the identified differences between the determined gain relationship and the historical gain relationship responsive to receipt of a manual input after installation of the lighting device.

12. An LED lighting control method, comprising:
    for each pairing that includes one or more LED emitters operatively coupled to the LED driver circuitry and one or more photodetectors:
    determining, by a control circuit, for each of a plurality of drive currents, a respective target luminous flux output of the one or more LED emitters;
    receiving, by the control circuit, data corresponding to a measured luminous flux output of the one or more LED emitters responsive to application of respective ones of the plurality of driver currents to the one or more LED emitters;
    receiving, by the control circuit, data representative of at least one photodetector electrical parameter, including at least one of: a photodetector current or a forward voltage across the one or more photodetectors, at each of the measured luminous flux outputs;
    determining, by the control circuit, a gain relationship between the target luminous flux output and the measured luminous flux output of the one or more LED emitters as a function of the photodetector electrical parameter; and
    identifying, by the control circuit, one or more differences between the determined gain relationship and data representative of a historical gain relationship stored in memory circuitry communicatively coupled to the control circuit; and
    determining, by the control circuit, one or more correction factors using the identified differences between the determined gain relationship and the historical gain relationship.

13. The method of claim 12, further comprising:
    causing, by the control circuit, storage in the memory circuitry of the data representative of the determined gain relationship as the data representative of the historical gain relationship such that the data representative of the measured gain relationship becomes the data representative of the historical gain relationship.

14. The method of claim 12 wherein identifying the one or more differences between the determined gain relationship and the data representative of the historical gain relationship further comprises:
identifying, by the control circuit, the one or more differences between the determined gain relationship and the data representative of the historical gain relationship that includes a mathematical relationship that includes a sum of a first gain factor with a second gain factor.

15. The method of claim 14 wherein identifying the one or more differences between the determined gain relationship and the data representative of the historical gain relationship that includes a mathematical relationship that includes the sum of the first gain factor with the second gain factor further comprises:
identifying, by the control circuit, one or more differences between the determined gain relationship and the data representative of the historical gain relationship in which the first gain factor includes a first relationship that includes a ratio of the luminous flux of the respective one or more LED emitters to the current through the one or more photodetectors as a function of the measured forward voltage across the one or more photodetectors.

16. The method of claim 14 wherein identifying the one or more differences between the determined gain relationship and the data representative of the historical gain relationship that includes a mathematical relationship that includes the sum of the first gain factor with the second gain factor further comprises:
identifying, by the control circuit, one or more differences between the determined gain relationship and the data representative of the historical gain relationship in which the second gain factor includes a second relationship between a measured gain needed to achieve a defined luminous flux output from the one or more LED emitters as a function of measured forward voltage across the one or more photodetectors.

17. The method of claim 16 wherein determining one or more correction factors using the identified differences between the determined gain relationship and the historical gain relationship further comprises:
determining, by the control circuit, one or more correction factors to apply to a historical second gain factor to provide an updated second gain factor based on the identified differences between the determined gain relationship and the data representative of the historical gain relationship.

18. The method of claim 12 wherein determining one or more correction factors using the identified differences between the determined gain relationship and the historical gain relationship further comprises:
determining, by the control circuit, one or more correction factors using the identified differences between the determined gain relationship and the historical gain relationship responsive to an initial application of power to the LED driver circuitry.

19. The method of claim 12 wherein determining one or more correction factors using the identified differences between the determined gain relationship and the historical gain relationship further comprises:
determining, by the control circuit, one or more correction factors using the identified differences between the determined gain relationship and the historical gain relationship responsive to each application of power to the LED driver circuitry.

20. The method of claim 12 wherein determining one or more correction factors using the identified differences between the determined gain relationship and the historical gain relationship further comprises:
determining, by the control circuit, one or more correction factors using the identified differences between the determined gain relationship and the historical gain relationship responsive to receipt of a manual input after installation of the lighting device.

21. A non-transitory, machine-readable, storage device that includes instructions that, when executed by an LED lighting control circuit, cause the control circuit to:
for each pairing that includes one or more LED emitters operatively coupled to the LED driver circuitry and one or more photodetectors:
determine for each of a plurality of drive currents a respective target luminous flux output of the one or more LED emitters;
receive, via a communicatively coupled communications interface, data corresponding to a measured luminous flux output of the one or more LED emitters responsive to application of respective ones of the plurality of driver currents to the one or more LED emitters;
receive data representative of at least one photodetector electrical parameter, including at least one of: a photodetector current or a forward voltage across the one or more photodetectors, at each of the measured luminous flux outputs;
determine a gain relationship between the target luminous flux output and the measured luminous flux output of the one or more LED emitters as a function of the photodetector electrical parameter; and
identify one or more differences between the determined gain relationship and data representative of a historical gain relationship stored in memory circuitry communicatively coupled to the control circuit; and
determine one or more correction factors using the identified differences between the determined gain relationship and the historical gain relationship.

22. The non-transitory, machine-readable, storage device of claim 21 wherein the machine-readable instructions, when executed by the control circuit, further cause the control circuit to:
cause a storage, in the communicatively coupled memory circuit, of the data representative of the determined gain relationship as the data representative of the historical gain relationship such that the data representative of the measured gain relationship becomes the data representative of the historical gain relationship.

23. The non-transitory, machine-readable, storage device of claim 22 wherein the machine-readable instructions that cause the control circuit to identify the one or more differences between the determined gain relationship and the data representative of the historical gain relationship further cause the control circuit to:
identify the one or more differences between the determined gain relationship and the data representative of the historical gain relationship that includes a mathematical relationship that includes a sum of a first gain factor with a second gain factor.

24. The non-transitory, machine-readable, storage device of claim 23 wherein the machine-readable instructions that cause the control circuit to identify the one or more differences between the determined gain relationship and the data representative of the historical gain relationship that includes a mathematical relationship that includes the sum of the first gain factor with the second gain factor further cause the control circuit to:
  identify one or more differences between the determined gain relationship and the data representative of the historical gain relationship in which the first gain factor includes a first relationship that includes a ratio of the luminous flux of the respective one or more LED emitters to the current through the one or more photodetectors as a function of the measured forward voltage across the one or more photodetectors.

25. The non-transitory, machine-readable, storage device of claim 24 wherein the machine-readable instructions that cause the control circuit to identify the one or more differences between the determined gain relationship and the data representative of the historical gain relationship that includes a mathematical relationship that includes the sum of the first gain factor with the second gain factor further cause the control circuit to:
  identify one or more differences between the determined gain relationship and the data representative of the historical gain relationship in which the second gain factor includes a second relationship between a measured gain needed to achieve a defined luminous flux output from the one or more LED emitters as a function of measured forward voltage across the one or more photodetectors.

26. The non-transitory, machine-readable, storage device of claim 25 wherein the machine-readable instructions that cause the control circuit to determine one or more correction factors using the identified differences between the determined gain relationship and the historical gain relationship further cause the control circuit to:
  determine one or more correction factors to apply to a historical second gain factor to provide an updated second gain factor based on the identified differences between the determined gain relationship and the data representative of the historical gain relationship.

27. The non-transitory, machine-readable, storage device of claim 21 wherein the machine-readable instructions that cause the control circuit to determine the one or more correction factors using the identified differences between the determined gain relationship and the historical gain relationship further cause the control circuit to:
  determining the one or more correction factors using the identified differences between the determined gain relationship and the historical gain relationship responsive to an initial application of power to the LED driver circuitry.

28. The non-transitory, machine-readable, storage device of claim 21 wherein the machine-readable instructions that cause the control circuit to determine the one or more correction factors using the identified differences between the determined gain relationship and the historical gain relationship further cause the control circuit to:
  determine the one or more correction factors using the identified differences between the determined gain relationship and the historical gain relationship responsive to each application of power to the LED driver circuitry.

29. The non-transitory, machine-readable, storage device of claim 21 wherein the machine-readable instructions that cause the control circuit to determine the one or more correction factors using the identified differences between the determined gain relationship and the historical gain relationship further cause the control circuit to:
  determine the one or more correction factors using the identified differences between the determined gain relationship and the historical gain relationship responsive to receipt of a manual input after installation of the lighting device.

* * * * *